United States Patent
Swerdlow

(10) Patent No.: US 12,388,888 B2
(45) Date of Patent: Aug. 12, 2025

(54) PACKET REPLACEMENT DURING POOR NETWORK CONNECTIVITY OR NETWORK CONGESTION

(71) Applicant: Zoom Video Communications, Inc., San Jose, CA (US)

(72) Inventor: Nick Swerdlow, Santa Clara, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/069,372

(22) Filed: Dec. 21, 2022

(65) Prior Publication Data

US 2024/0214441 A1   Jun. 27, 2024

(51) Int. Cl.
| | |
|---|---|
| H04L 29/06 | (2006.01) |
| G10L 15/26 | (2006.01) |
| G10L 25/78 | (2013.01) |
| H04L 65/403 | (2022.01) |
| H04L 65/75 | (2022.01) |
| H04M 3/42 | (2006.01) |
| H04M 7/00 | (2006.01) |
| H04N 7/15 | (2006.01) |

(52) U.S. Cl.
CPC ............ *H04L 65/75* (2022.05); *G10L 15/26* (2013.01); *H04L 65/403* (2013.01)

(58) Field of Classification Search
CPC ........ H04L 65/75; H04L 65/403; G10L 15/26
See application file for complete search history.

(56) References Cited

U.S. PATENT DOCUMENTS

| | | | | |
|---|---|---|---|---|
| 5,864,812 | A * | 1/1999 | Kamai | G10L 13/02 704/258 |
| 6,169,843 | B1 * | 1/2001 | Lenihan | H04N 9/8042 348/E5.005 |
| 7,130,316 | B2 * | 10/2006 | Kovacevic | H04N 21/4341 348/E5.122 |
| 7,590,231 | B2 | 9/2009 | Tighe et al. | |
| 8,214,216 | B2 * | 7/2012 | Sato | G10L 13/027 704/263 |
| 8,385,527 | B2 * | 2/2013 | Hyndman | H04L 65/1089 379/202.01 |
| 8,527,276 | B1 * | 9/2013 | Senior | G06N 3/084 704/258 |
| 8,983,836 | B2 * | 3/2015 | Woodward | G10L 15/22 704/235 |
| 9,405,741 | B1 | 8/2016 | Schaaf et al. | |
| 9,538,129 | B2 | 1/2017 | Reynolds | |
| 9,653,071 | B2 | 5/2017 | Gupta et al. | |

(Continued)

*Primary Examiner* — Umar Cheema
*Assistant Examiner* — Golam Mahmud
(74) *Attorney, Agent, or Firm* — Young Basile Hanlon & MacFarlane, P.C.

(57) ABSTRACT

A server generates a continuous audio stream during periods of poor network connectivity or network congestion. The server obtains a first audio stream from a user device connected to a real-time communication session and detects one or more missing packets in the first audio stream. The server obtains recorded portions of audio that correspond to the missing packets and combines the recorded portions of the audio with the first audio stream to generate the continuous audio stream without missing packets. The server transmits the continuous audio stream to other user devices connected to the real-time communication session.

20 Claims, 9 Drawing Sheets

(56) References Cited

U.S. PATENT DOCUMENTS

| | | | |
|---|---|---|---|
| 10,147,415 B2* | 12/2018 | Cutler | H04M 7/006 |
| 10,516,782 B2 | 12/2019 | Cartwright et al. | |
| 10,522,151 B2 | 12/2019 | Cartwright et al. | |
| 10,672,393 B2 | 6/2020 | Rivlin et al. | |
| 10,796,686 B2* | 10/2020 | Arik | G10L 13/027 |
| 10,897,492 B1* | 1/2021 | VanBlon | H04L 65/80 |
| 11,272,257 B2* | 3/2022 | Luo | H04N 21/233 |
| 12,020,148 B1 | 6/2024 | Mills et al. | |
| 2006/0136214 A1* | 6/2006 | Sato | G10L 13/027 |
| | | | 704/265 |
| 2010/0131264 A1 | 5/2010 | Ljolje et al. | |
| 2010/0202348 A1* | 8/2010 | Sambhwani | H04L 1/1822 |
| | | | 370/328 |
| 2010/0208647 A1* | 8/2010 | Nagao | H04B 7/2606 |
| | | | 370/315 |
| 2011/0288863 A1* | 11/2011 | Rasmussen | G10L 15/26 |
| | | | 704/235 |
| 2013/0300666 A1* | 11/2013 | Archer | G06F 3/0237 |
| | | | 345/168 |
| 2015/0081291 A1* | 3/2015 | Jeon | G06F 3/0482 |
| | | | 704/235 |
| 2015/0100315 A1* | 4/2015 | Bianco | H04M 3/42391 |
| | | | 704/235 |
| 2015/0244761 A1* | 8/2015 | Tsyganok | H04L 1/08 |
| | | | 709/219 |
| 2016/0057390 A1* | 2/2016 | Ramalho | H04L 65/4025 |
| | | | 348/14.08 |
| 2016/0365087 A1 | 12/2016 | Freud | |
| 2018/0336902 A1* | 11/2018 | Cartwright | G06F 16/61 |
| 2020/0184016 A1 | 6/2020 | Roller | |
| 2020/0250376 A1 | 8/2020 | Guo et al. | |
| 2021/0149996 A1 | 5/2021 | Bellegarda | |
| 2021/0160300 A1* | 5/2021 | Zhao | H04L 43/0829 |
| 2021/0385575 A1* | 12/2021 | Meiyappan | G06F 3/165 |
| 2022/0086209 A1* | 3/2022 | Suto | H04L 65/765 |
| 2022/0156836 A1 | 5/2022 | Katschinski et al. | |
| 2022/0165257 A1 | 5/2022 | Singh et al. | |
| 2022/0172713 A1 | 6/2022 | Kwatra et al. | |
| 2023/0075891 A1 | 3/2023 | Zheng et al. | |
| 2023/0207061 A1 | 6/2023 | Hamp et al. | |
| 2023/0353406 A1* | 11/2023 | Hannun | G06F 40/58 |

* cited by examiner

US 12,388,888 B2

PACKET REPLACEMENT DURING POOR NETWORK CONNECTIVITY OR NETWORK CONGESTION

FIELD

This disclosure generally relates to continuous audio stream generation, and in particular, continuous audio stream generation during periods of poor network connectivity or network congestion.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
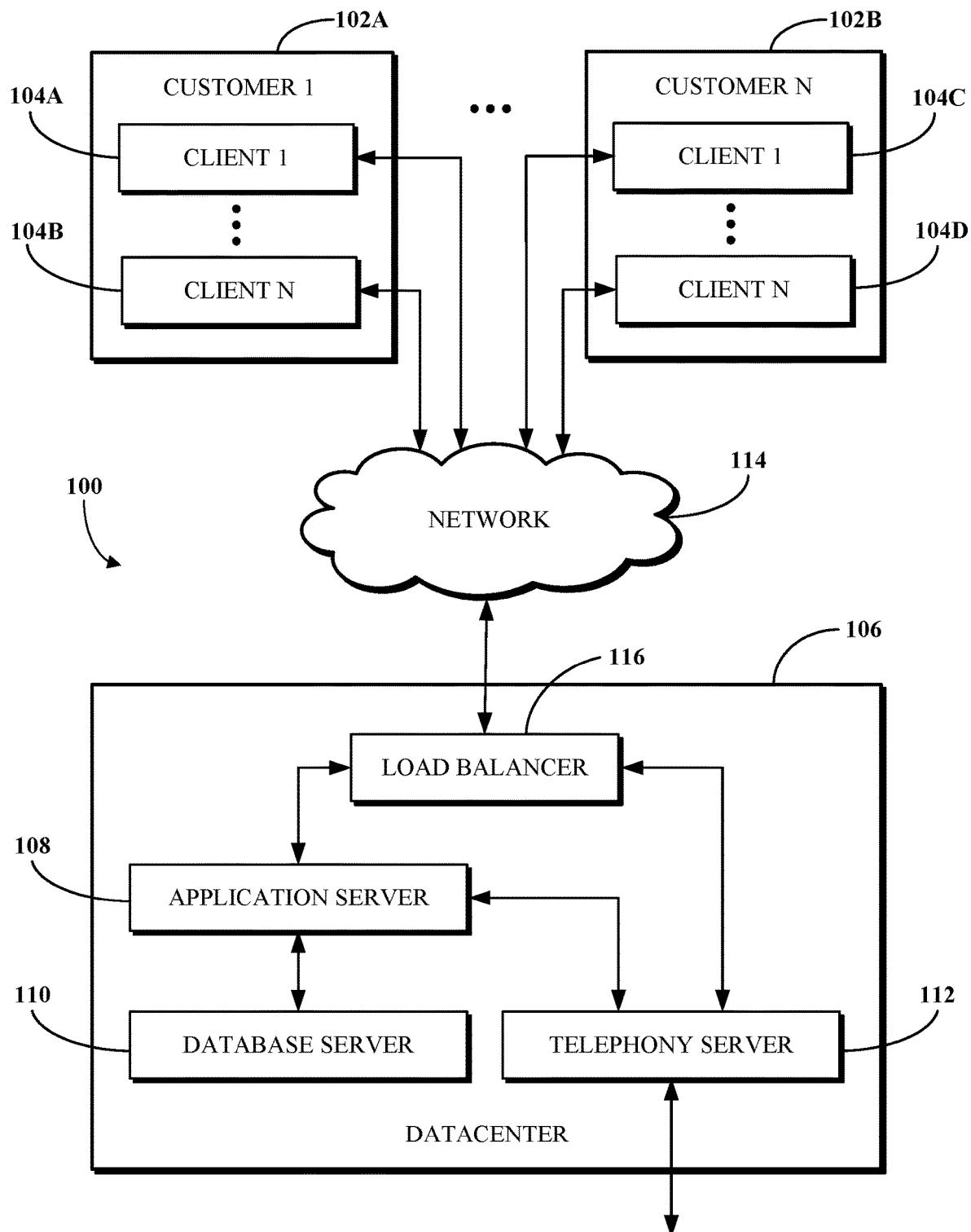
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

Software platforms, such as UCaaS platforms, can implement software services enabling communications over one or more modalities such as telephony, email, text messaging, chat, or audio or video conferencing. Some of those modalities, including telephony and audio or video conferencing, rely upon real-time exchanges of communications between participants. However, the ability to participate in a telephone call or conference in large part depends upon the availability of network bandwidth for connecting the individual participants' devices to the communication software. During periods of poor network connectivity or network congestion in real-time communication sessions such as telephony and audio or video conferencing communications, the transmission of audio information, such as audio packets, can be negatively affected, thereby affecting the ability to participate in the real-time communication session. For example, the poor network connectivity or network congestion can cause a loss of one or more packets that result in one or more spoken words from a real-time communication session participant to be dropped, making it difficult for other real-time communication session participants to understand what was said and disrupting the continuity of the real-time communication session.

Typical software platforms retransmit the lost packets during periods of poor network connectivity or network congestion. Retransmitting the lost packets, while potentially useful to the completeness of the conversation, generally introduces delay into the communication. To reduce the amount of delay, these software platforms typically transmit a portion of the lost packets, which results in poor audio quality and inadequate word replacement. In addition, retransmitting the lost packets does not solve the problem of dropped words when a hardware or software error, as opposed to a network issue, at the transmitting user device causes the transmission of invalid packets. In this case, the retransmitted packets will also be invalid, therefore the words will still be dropped.

Implementations of this disclosure address problems such as these by replacing the lost packets with recorded audio from the user device of the real-time communication session participant that is speaking. The audio can be recorded at the user device when packet loss is detected and stored in a memory of the user device. By using recorded audio from the user device, the system does not need to rely on the retransmission of packets to generate a continuous audio stream without missing packets. In some implementations, the missing words in the audio stream are detected and replaced with synthesized words in the conference participant's voice. The missing words may, for example, be predicted using a machine learning (ML) model. According to the implementations of this disclosure, a system implementing a real-time communication such as a telephone call or audio or video conference does not need to rely on the retransmission of packets to generate a continuous audio stream without missing words.

To describe some implementations in greater detail, reference is first made to examples of hardware and software structures used to generate a continuous audio stream during periods of poor network connectivity or network congestion. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to case the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
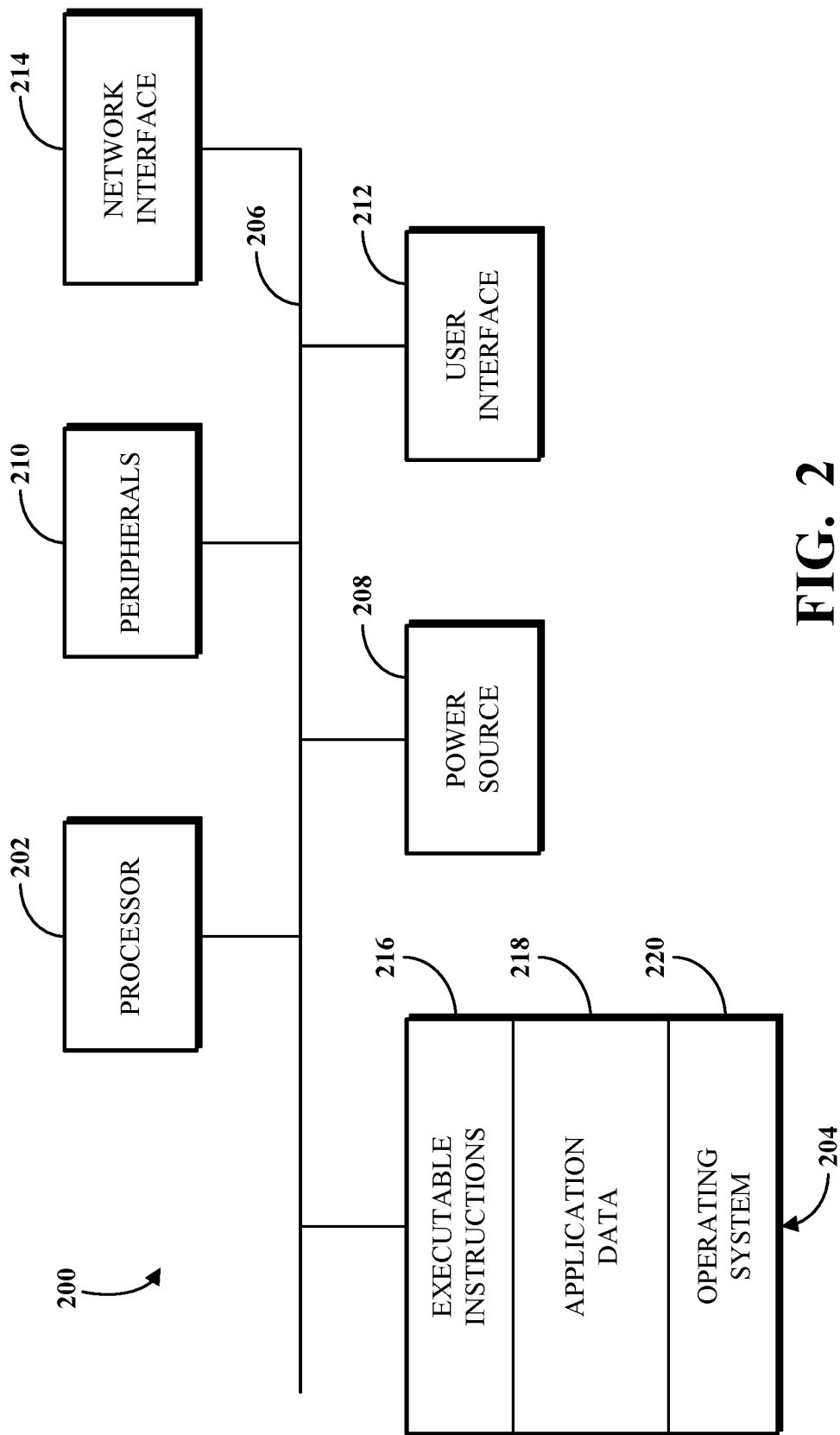
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
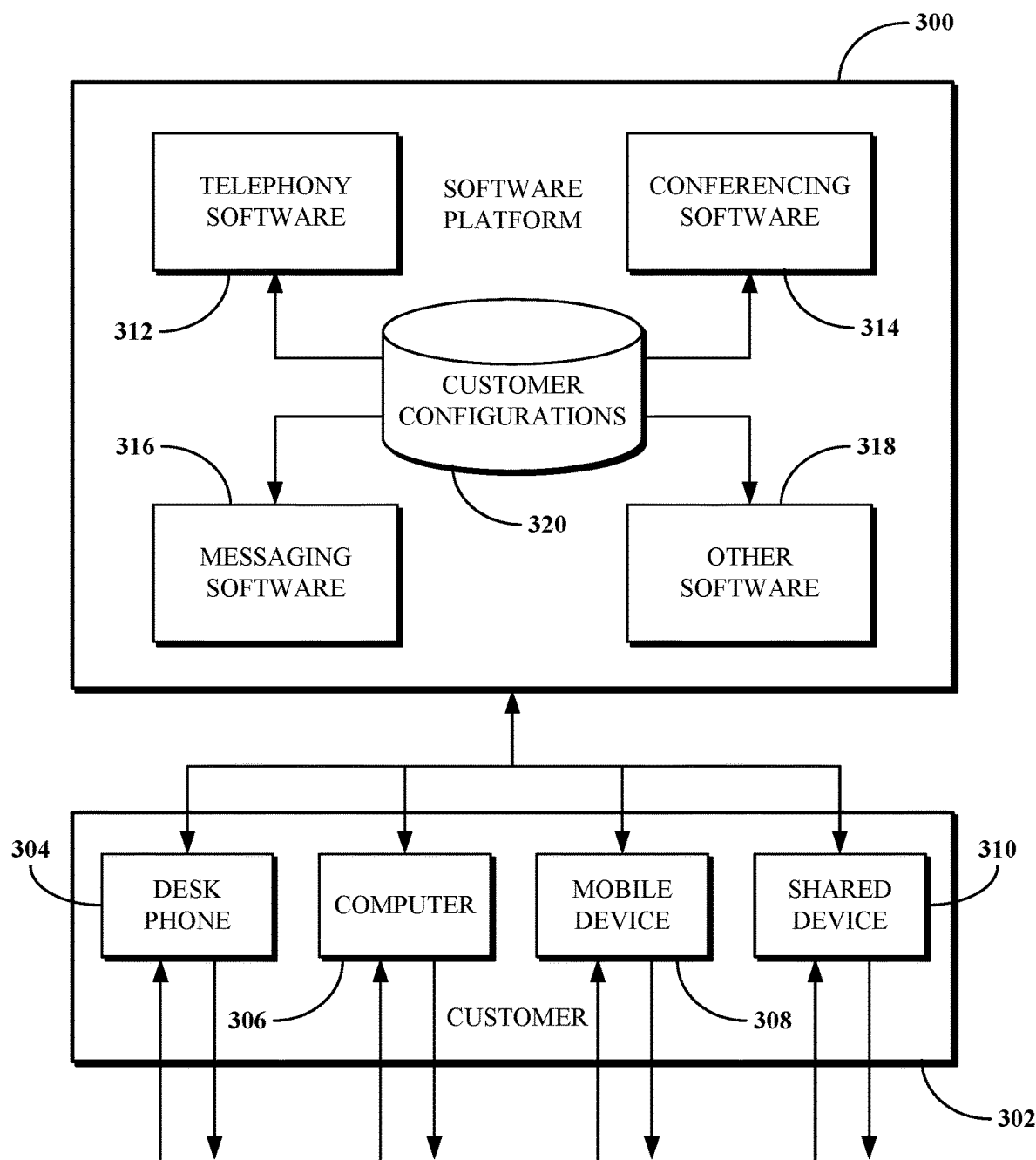
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIPenabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for generating a continuous audio stream during periods of poor network connectivity or network congestion. In some such cases, the telephony software 312 may include the other software 318. In other such cases, the conferencing software 314 may include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
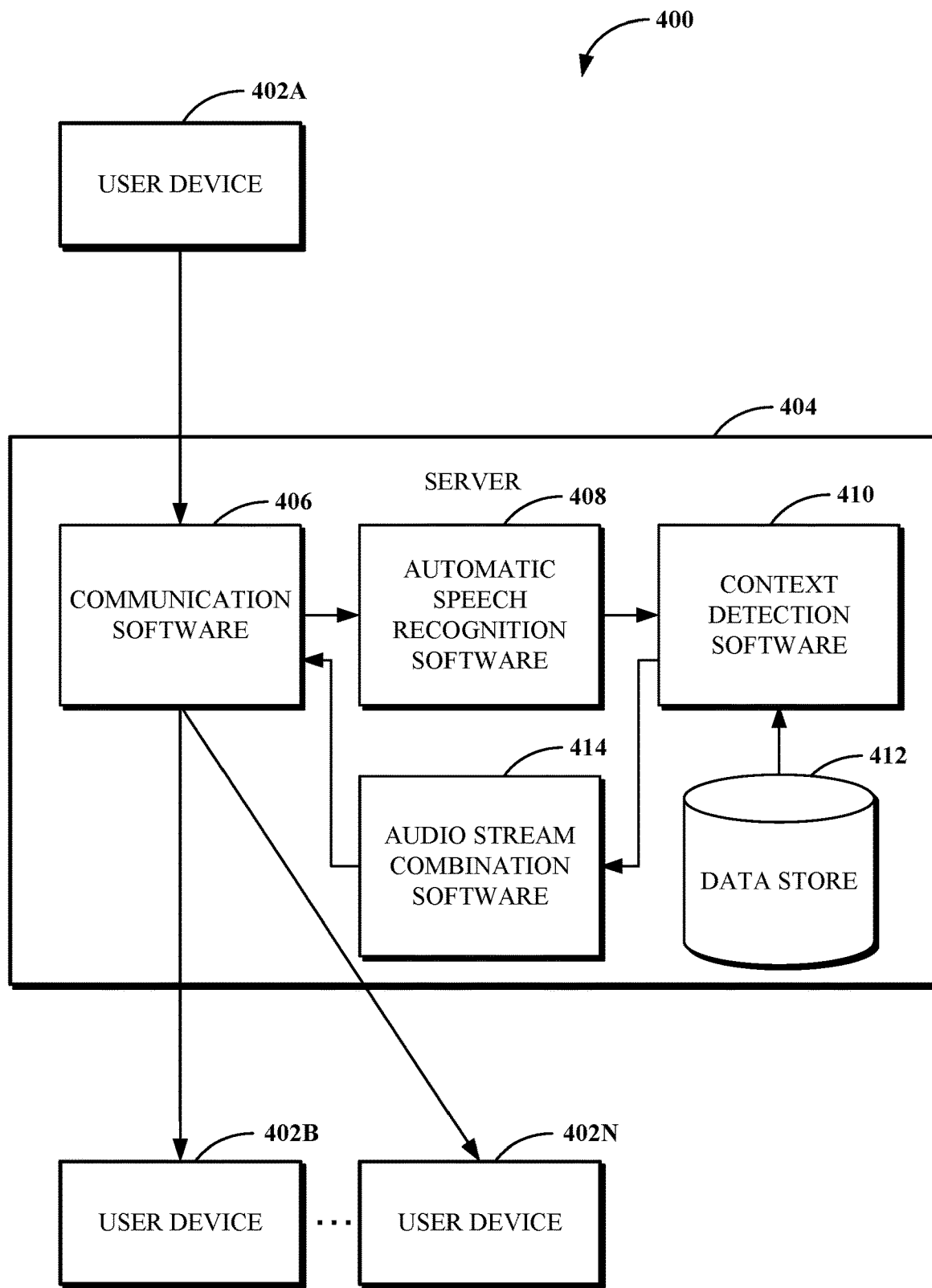
FIG. 4 is a block diagram of an example of a system for generating a continuous audio stream during periods of poor network connectivity or network congestion.

FIG. 4 is a block diagram of an example of a system 400 for generating a continuous audio stream during periods of poor network connectivity or network congestion. The system 400 includes user devices 402A-402N and server 404. The user devices 402A-402N may each be a device such as any one of the clients 304 through 310 shown in FIG. 3; however, the user devices 402A-402N need not be client devices. The server 404 may be a server device or a virtual server and is used to implement one or more software services of a software platform, for example, the software platform 300 shown in FIG. 3. In an example, the generation of the continuous audio stream may be implemented by the server 404 running the other software 318.

The user devices 402A-402N are configured to communicate with each other during a real-time communication session via a communication software 406 (e.g., the conferencing software 314) running at the server 404. The user devices 402A-402N may communicate with each other during the real-time communication session using communications that include telephone communications, VOIP communications, short messaging service (SMS) text communications, webchat communications, video chat communications, social media communications, email communications, and other digital service communications.

The server 404 is configured to monitor the communications between the user devices 402A-402N during the real-time communication session using the communication software 406 and an automatic speech recognition (ASR) software 408. The ASR software 408 is, includes, or otherwise uses a transcription engine that is configured to monitor audio output from the user devices 402A-402 during the conference implemented by the communication software 406. In an example, the user device 402A transmits an audio stream in the form of packets to the server 404 during a period of poor network connectivity or network congestion, in either case resulting in the loss of one or more packets. The one or more missing packets may be associated with one or more words spoken by a user of the user device 402A. The communication software 406 is configured to detect packet loss in the audio stream and obtain recorded portions of audio from the user device 402A. The recorded portions of audio correspond to the one or more missing packets. The ASR software 408 is configured to detect speech within the audio stream received from the user device 402A. The ASR software 408 is configured to convert the detected speech to text. In some cases, the functionality for converting the detected speech to text may be performed using methods other than ASR.

Context detection software 410 of the server 404 is configured to analyze the text for one or more keywords. The context detection software 410 may detect a keyword by comparing the text to a list of keywords stored in a data store 412 of the server 404. The list of keywords may include specific words, semantic concepts, or both. The context detection software 410 may detect a context of a sentence or a phrase, for example, based on one or more keywords. The context of the sentence or the phrase may be determined using an ML model that can determine a context of a keyword by analyzing data including data associated with a neighboring word range of the keyword, a user speech profile, location data to determine a geographic region of the user, or a combination thereof. The user speech profile may be based on previous real-time communication recordings associated with the real-time communication participant. The user speech profile may be stored in the data store 412 and include data associated with a speech pattern of the user, such as particular words or phrases that the user uses, a context of when the user uses the particular words or phrases, user accent data (e.g., data associated with how the user pronounces words), speech cadence data (e.g., data associated with the speed at which the user speaks), speech tone data (e.g., data associated with the pitch at which the user speaks), speech inflection data (e.g., data associated with the user's emphasis on certain syllables or words), or a combination thereof. The ML model may be trained using a training data set that includes audio recordings of the real-time communication participant speaking a number of words and/or phrases. The ML model is tuned based on the speech pattern of the user.

In an example, the context detection software 410 may determine that one or more words are missing in the audio stream based on the context of one or more keywords (e.g., a phrase). The syntax of the phrase is determined from the context of the phrase. If the syntax of the phrase is indeterminable, the context detection software 410 determines that one or more words are missing in the audio stream. In some implementations, the context detection software 410 may predict one or more words to replace the one or more missing words. The context detection software 410 may generate a list of candidates of predicted words based on the syntax of the phrase and the user speech profile. The predicted words are extrapolated from the training data set to determine audio representations for missing words.

Audio stream combination software 414 of the server 404 is configured to combine missing portions of the audio stream, such as missing packets or missing words, to generate a combined audio stream. The combined audio stream is continuous such that it that does not have missing packets or missing words. In some implementations, the audio stream combination software 414 may be configured to match a timestamp of the recorded portion of audio to a timestamp of a missing packet and insert the recorded portion of the audio into a corresponding timeslot of the missing packet to generate the combined audio stream. In some implementations, the audio stream combination software 414 may be configured to synthesize a predicted word. The predicted word may be synthesized in the voice of the user and combined with the audio stream to generate the combined audio stream. The audio stream combination software 414 may use the user speech profile to synthesize the predicted word in the voice of the user. The server 404 may transmit the combined audio stream via the communication software 406 to the user devices 402B-402N for output at those devices during the real-time communication session.

The following example use case is provided as an illustrative implementation of the system 400 shown in FIG. 4. In this example, there may be an on-going real-time communication session occurring in a video conference setting. At some point during the real-time communication session, a participant's audio may be interrupted due to network congestion such that one or more spoken words of the participant are broken up or missing completely. In this example, the server 404 detects that there are some gaps in the participant's audio stream and replaces the gaps with recorded audio from the participant's device or with synthesized words in the voice of the participant.

Figure 5A:
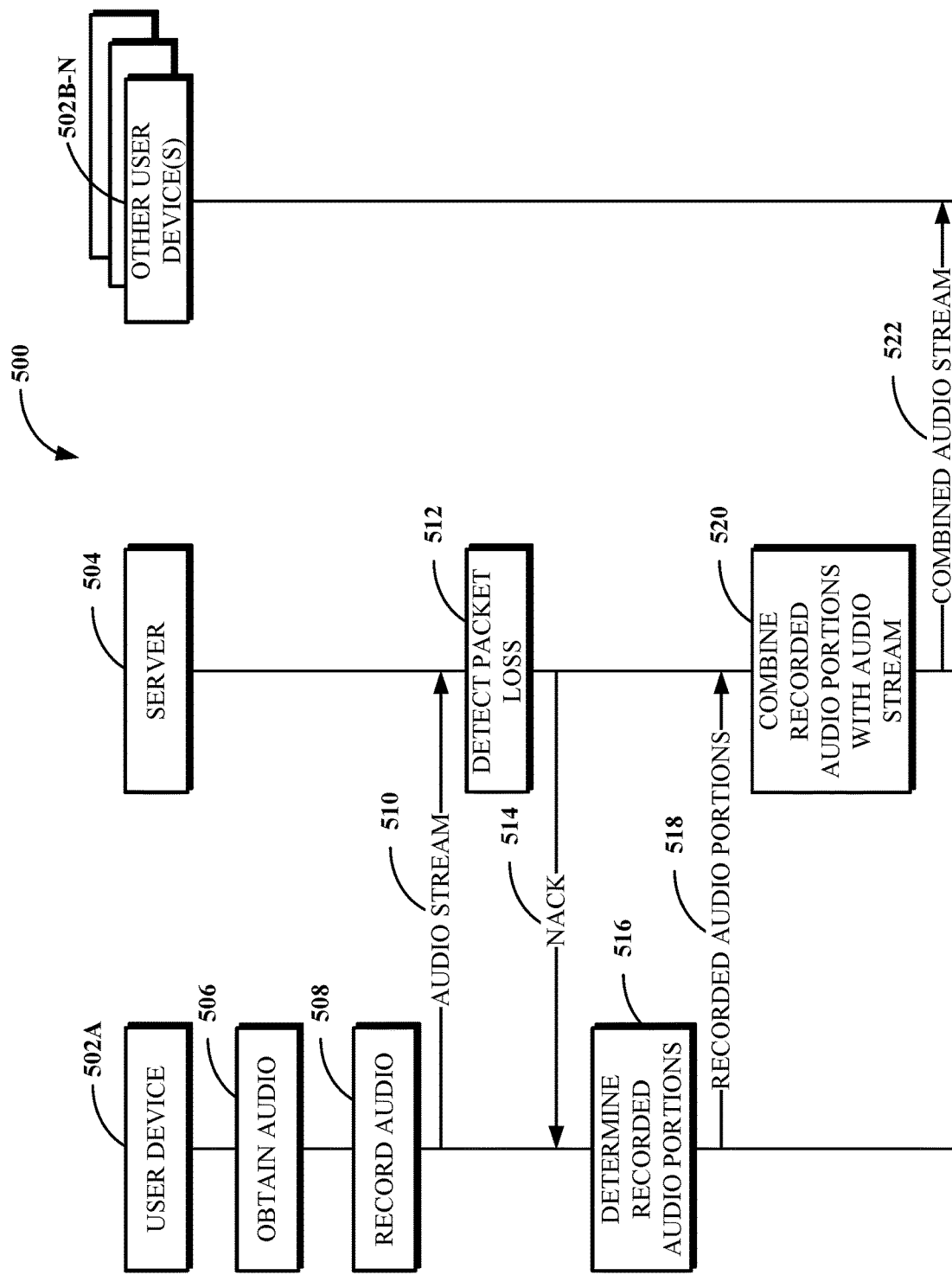
FIGS. 5A-B are swim lane diagrams of examples of a system for generating a continuous audio stream.
Figure 5B:
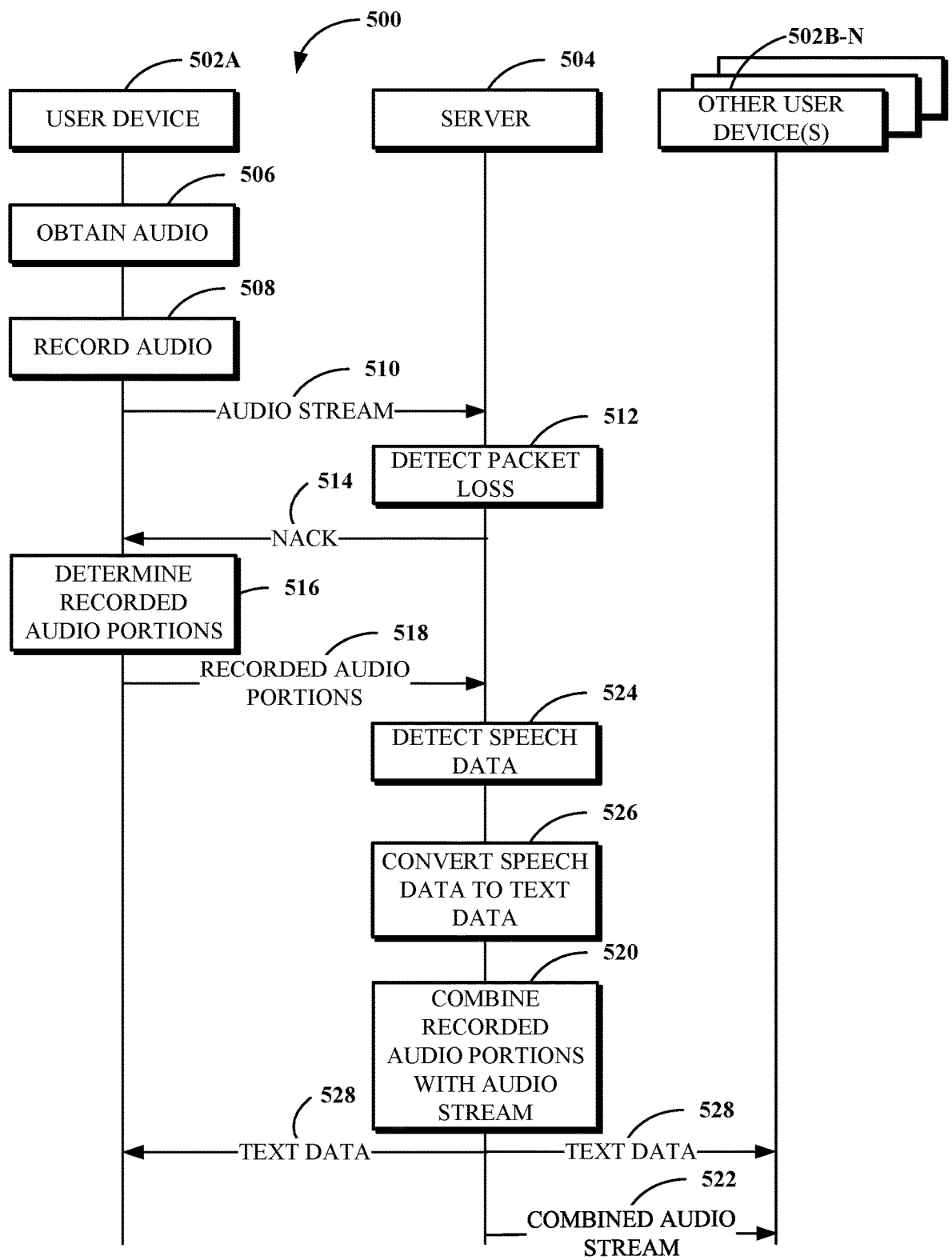

FIGS. 5A-B are swim lane diagrams of examples of a system 500 for generating a continuous audio stream. The system 500 may be or may be an implementation of the system 400 shown in FIG. 4. The system 500 includes a user device 502A, one or more other user devices 502B-502N, and a server 504. The user device 502A and the other user devices 502B-502N are configured to communicate with each other during a real-time communication session via the server 504. The server 504 implements a real-time communication session to which the user device 502A and the other user devices 502B-502N connect. For example, the user device 502A and the other user devices 502B-502N may be the user devices 402A-402N shown in FIG. 4 and the server 504 may be the server 404 shown in FIG. 4.

The user device 502A is associated with a real-time communication session participant who is speaking during the real-time communication session. The user device 502A is configured to obtain 506 audio of the real-time communication session participant, for example, via a microphone of the user device 502A. The user device 502A, via the microphone and based on the connection of the user device 502A to the real-time communication session, is configured to record 508 the audio of the real-time communication session participant. The audio may be recorded based on a user setting or an administrator setting, and may be recorded continuously, based on a detection of poor network connectivity, or based on a detection of network congestion. The recorded audio may be stored in a memory of the user device 502A. The recorded audio may be stored in the memory for a predetermined duration of time (e.g., a buffering threshold of at least 5 seconds) and overwritten at the expiration of the predetermined duration of time. The user device 502A is configured to transmit the audio of the real-time communication session participant as an audio stream 510. The user device 502A is configured to transmit the audio stream as packetized data (e.g., packets). Each packet transmitted by the user device 502A includes a sequence number.

The server 504 is configured to receive the audio stream 510 from the user device 502A. The server 504 is configured to store a portion of the audio stream 510 in a memory for a predetermined duration of time (e.g., a buffering threshold that is less than 5 seconds). The server 504 is configured to transmit an acknowledgement (ACK) to the user device 504A for each packet that is successfully received. During periods of poor network connectivity or network congestion, the server 504 may fail to receive one or more packets, resulting in a discontinuous audio stream. The server 504 is configured to detect 512 packet loss in the audio stream 510 based on the sequence numbers of the packets received from the user device 502A or based on the time stamps of the packets received from the user device 502A. The server 504 determines that a packet is lost when a packet with a given sequence number is not received within a predetermined duration of time. When the server 504 detects 512 packet loss in the audio stream 510, the server 504 may transmit a negative acknowledgement (NACK) 514 for each missing packet.

The user device 502A receives the NACK(s) 514 from the server 504, determines 516 recorded audio portions based on the NACK(s) 514, and transmits the recorded audio portions 518 to the server 504. The determined audio portions correspond to each of the missing packets. In an example, the user device 502A may be configured to match a timestamp of a recorded audio portion to a timestamp of a respective missing packet (e.g., based on a respective NACK) to determine the recorded audio portions. In an example where a NACK 514 is not received, the user device 502A is configured to determine 516 the recorded audio portions based on an ACK that was not received from the server 504. In this example, since the user device 502A knows the timestamps of each packet that the user device 502A has transmitted and the timestamps of each recorded audio portion, the user device 502A may be configured to match the timestamp of a recorded audio portion to a timestamp of a respective ACK that was expected and not received to determine the recorded audio portions.

The server 504 is configured to receive the recorded audio portions 518 from the user device 502A. The server 504 combines 520 the recorded audio portions with the portion of the audio stream 510 stored in the memory to generate a combined audio stream 522. In an example, the server 504 may be configured to correlate a timestamp of each recorded audio portion to a sequence number of a respective missing packet. The server 504 may be configured to insert each recorded audio portion into a respective timeslot of the respective missing packet to generate the combined audio stream 522. The combined audio stream 522 is a continuous audio stream that does not have missing packets. The server 504 is configured to transmit the combined audio stream 522 to the other user devices 504B-504N. In some examples, the user device 502A may combine the recorded audio portions of the audio stream 510 to generate a combined audio stream.

In an implementation, such as the implementation shown in FIG. 5B, the server 504 may be configured to detect 524 speech data in the portion of the audio stream 510, the recorded audio portions 518, or both. In this implementation, the server 504 is configured to convert 526 the speech data to text data (e.g., using ASR). The server 504 is configured to transmit the text data 528 to the user devices 502A-502N. The text data 528 is displayed on the respective displays of the user device 502A and the other user devices 502B-502N as a transcript of the audio of the real-time communication session participant. In an example, the text data 528 may be transmitted simultaneously with the combined audio stream 522 or embedded within the combined audio stream 522.

Figure 6:
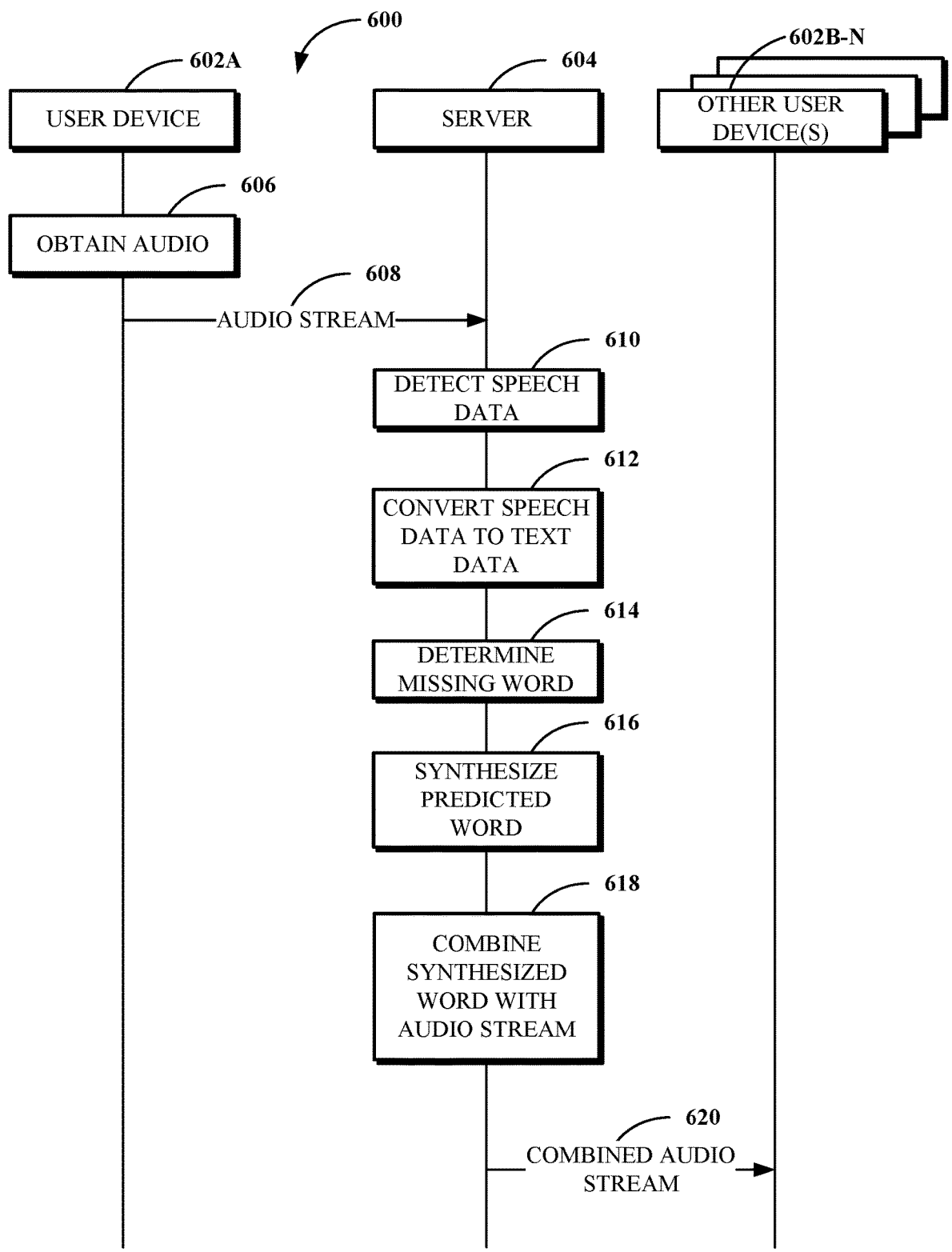
FIG. 6 is a swim lane diagram of another example of a system for generating a continuous audio stream.

FIG. 6 is a swim lane diagram of another example of a system 600 for generating a continuous audio stream. The system 600 is an implementation of the system 400 shown in FIG. 4. The system 600 includes a user device 602A, one or more user devices 602B-602N, and a server 604. The user device 602A and the other user devices 602B-602N are configured to communicate with each other during a real-time communication session via the server 604. As with the discussion of FIG. 5, the server 604 implements a real-time communication session to which the user device 602A and the other user devices 602B-602N connect. For example, the user device 602A and the other user devices 602B-602N may be the user devices 402A-402N shown in FIG. 4 and the server 604 may be the server 404 shown in FIG. 4. In some cases, the system 600 may be, or may be implemented by, the system 500 shown in FIGS. 5A-B. For example, the user device 602A and the other user devices 602B-602N may be the user device 502A and the other user devices 502B-502N shown in FIG. 5 and the server 604 may be the server 504 shown in FIG. 5.

The user device 602A is associated with a real-time communication session participant who is speaking during the real-time communication session. The user device 602A is configured to obtain 606 audio of the real-time communication session participant, for example, via a microphone of the user device 602A. The user device 602A is configured to transmit the audio of the real-time communication session participant as an audio stream 608.

The server 604 is configured to receive the audio stream 608 from the user device 602A. The server 604 may be configured to store a portion of the audio stream 608 in a memory for a predetermined duration of time (e.g., a buffering threshold that is less than 5 seconds). The server 604 detects 610 speech data in the portion of the audio stream 608 and converts 612 the speech data to text data that includes one or more words, phrases, or sentences. The server 604 is configured to determine 614 that the text data is missing one or more words based on a context of the one or more words, phrases, or sentences. Determining that the text data is missing one or more words includes predicting what the one or more missing words are. The prediction of the one or more missing words can be based on the context of the one or more words, phrases, or sentences, a user speech profile, or both.

The server 604 is configured to synthesize 616 one or more predicted words to replace one or more missing words. The one or more predicted words may be synthesized in a voice of the real-time communication session participant associated with the user device 602A. The server 604 synthesizes the one or more predicted words using a speech synthesizer. The speech synthesizer may be implemented as hardware or software. The speech synthesizer synthesizes the one or more predicted words using a vocal model of the real-time communication session participant to convert text data of the one or more predicted words to a wave form of the one or more predicted words. The speech synthesizer may use a deep neural network (DNN) to synthesize the one or more predicted words in the voice of the real-time communication session participant. The DNN trains the vocal model of the real-time communication session participant using audio recordings of real-time communication sessions of the real-time communication session participant. The vocal model can be trained using user accent data, speech cadence data, speech tone data, and/or speech inflection data of the real-time communication session participant. The vocal model can be used to extrapolate audio representations of the one or more predicted words in the voice of the real-time communication session participant. If there are multiple real-time communication session participants sharing one user device for the real-time communication session, the server 604 may use voice recognition software to identify the particular real-time communication session participant that is speaking, for example using voice fingerprinting, and synthesize the one or more predicted words in the identified real-time communication session participant's voice.

The server 604 is configured to combine 618 the one or more synthesized words with the audio stream 608 stored in the memory to generate a combined audio stream 620. In an example, the server 604 may be configured to insert each synthesized word into a respective portion of the audio stream 608 corresponding to a respective missing word to generate the combined audio stream 620. The combined audio stream 620 is a continuous audio stream that does not have missing words. The server 604 is configured to transmit the combined audio stream 620 to the other user devices 604B-604N.

In some implementations, the server 604 may transmit a notification to the other user devices 604B-604N that indicates that a portion of the combined audio stream 620 is synthesized. For example, the server 604 may embed the notification within the combined audio stream 620 or transmit the notification separately from the combined audio stream 620.

In some implementations, the server 604 may transmit to the user device 602A a request for feedback regarding the accuracy of the synthesized portion of the combined audio stream 620. In an example, the request for feedback may be transmitted each time synthesized content is transmitted. In another example, the request for feedback may be transmitted for synthesized content that has been synthesized for the first time or for synthesized content that was previously synthesized inaccurately. In some implementations, the request for feedback includes text of the synthesized content. The user may input a response that indicates whether the synthesized content is accurate via a user interface of the user device 602A or may input a correction to the synthesized content. The correction may be input as text data or voice data. The user device 602A transmits a message in response to the input. The server 604 may receive the message in response to the request that indicates whether the synthesized portion of the combined audio stream is accurate. The server 604 may update an ML model for determining a missing word based on the message. In some implementations, the correction may be synthesized in the voice of the real-time communication session participant and inserted into the combined audio stream 620.

Figure 7:
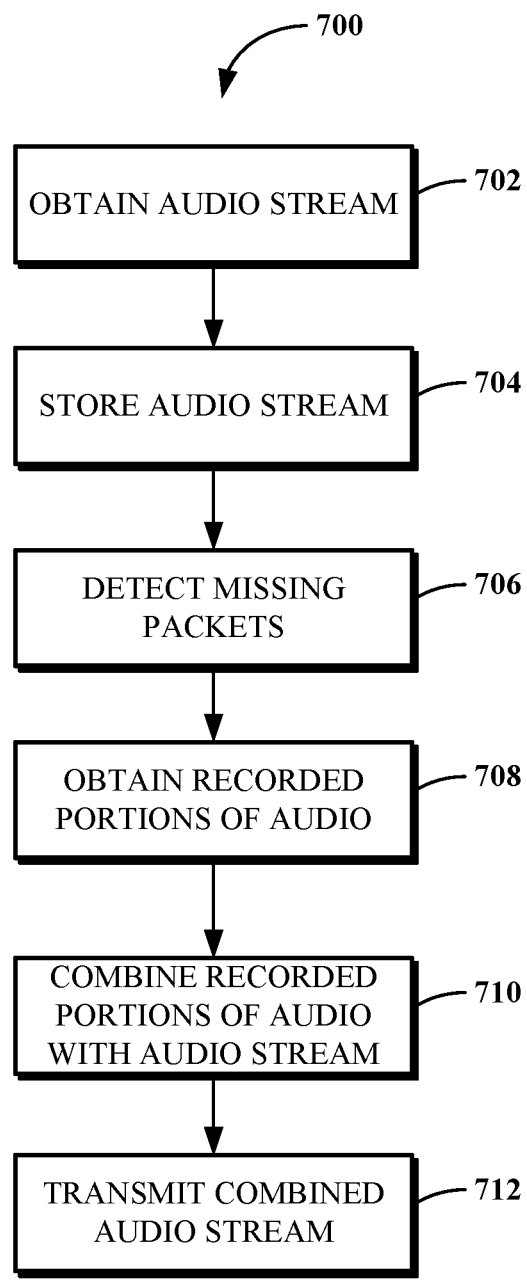
FIG. 7 is a flowchart of an example of a method for generating a continuous audio stream during periods of poor network connectivity or network congestion.
Figure 8:
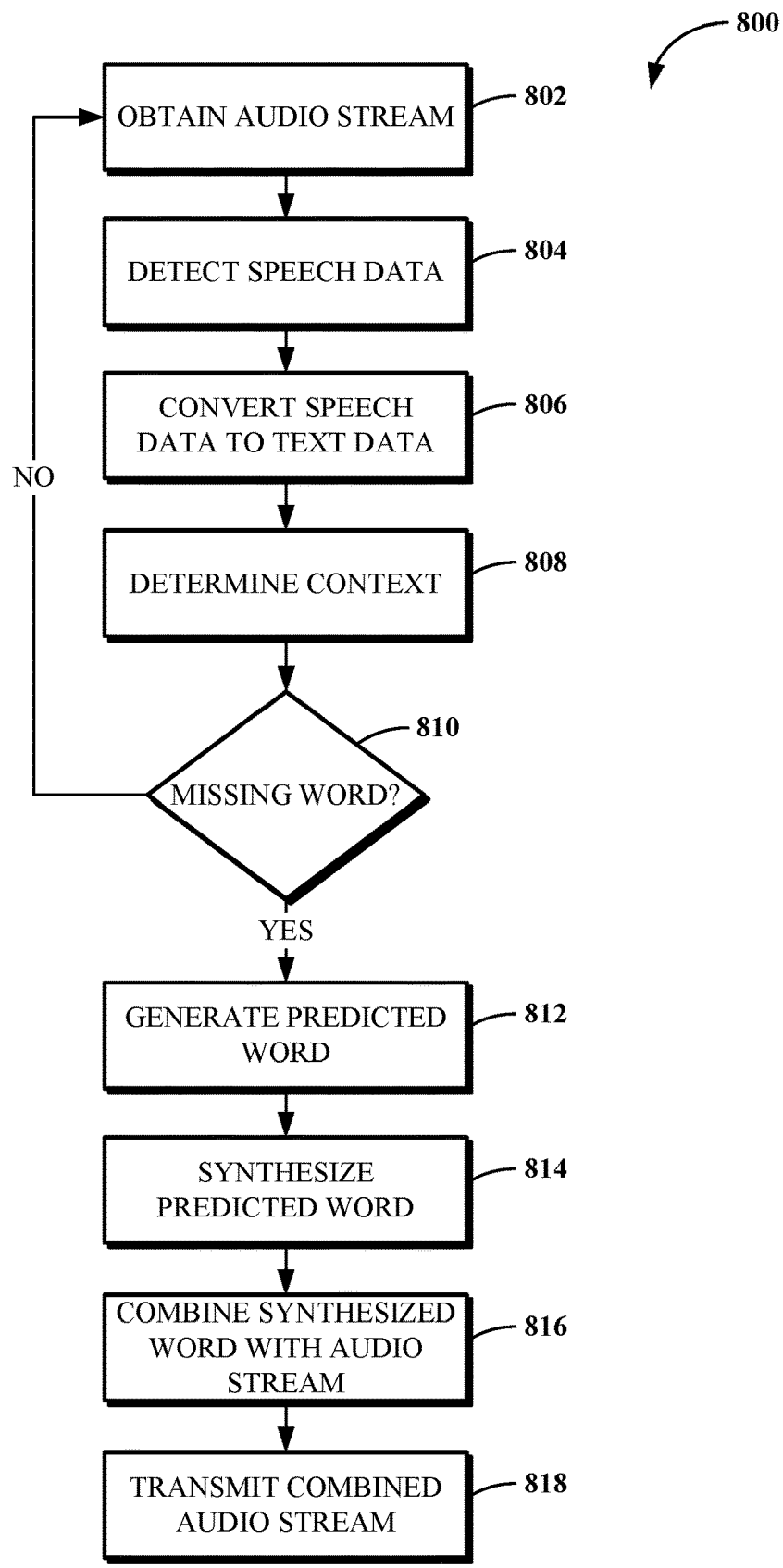
FIG. 8 is a flowchart of an example of another method for generating a continuous audio stream during periods of poor network connectivity or network congestion.

To further describe some implementations in greater detail, reference is next made to examples of methods that may be performed by or using a system for generating a continuous audio stream. FIGS. 7 and 8 are flowcharts of examples of methods for generating a continuous audio stream. The methods can be executed using computing devices, such as the systems, hardware, and software described with respect to FIGS. 1-4. The methods can be performed, for example, by executing a machine-readable program or other computer-executable instructions, such as routines, instructions, programs, or other code. The steps, or operations, of the methods or other techniques, methods, processes, or algorithms described in connection with the implementations disclosed herein can be implemented directly in hardware, firmware, software executed by hardware, circuitry, or a combination thereof.

For simplicity of explanation, the methods are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 7 is a flowchart of an example of a method 700 for generating a continuous audio stream during periods of poor network connectivity or network congestion. At 702, the method 700 includes obtaining an audio stream from the user device. The audio stream may be obtained as one or more packets.

At 704, the method 700 includes storing the audio stream in a memory for a predetermined duration of time (e.g., less than 5 seconds). The memory is configured to function as a buffer for processing the audio stream.

At 706, the method 700 includes detecting one or more missing packets in the audio stream. Detection of the one or more missing packets may be based on sequence numbers of the packets of the audio stream. Since each packet of the audio stream includes a sequence number, a missing packet can be detected when a sequence number is missing. In some instances, a packet may be deemed missing if it is received with errors or is otherwise unreadable.

At 708, the method 700 includes obtaining recorded audio portions from the user device. The recorded audio portions obtained from the user device correspond to each of the missing packets. The recorded audio portions contain audio of a real-time communication session participant associated with the user device.

At 710, the method 700 includes combining the recorded audio portions with the audio stream stored in the memory to generate a combined audio stream. Combining the recorded audio portions with the audio stream may include matching a timestamp of each recorded audio portion to a timestamp of a respective missing packet. Each recorded audio portion can be inserted into a respective timeslot of the respective missing packet to generate the combined audio stream. The combined audio stream is a continuous audio stream that does not have missing packets. At 712, the method 700 includes transmitting the combined audio stream to the user devices of the other real-time communication session participants.

FIG. 8 is a flowchart of an example of another method 800 for generating a continuous audio stream during periods of poor network connectivity or network congestion. At 802, the method 800 includes receiving an audio stream from a user device. The audio stream corresponds to audio of a real-time communication session participant from the user device.

At 804, the method 800 includes detecting speech data in the audio stream. The speech data may be detected using ASR software that monitors the audio stream. The speech data includes one or more words, phrases, or sentences. At 806, the method 800 includes converting the speech data to text data.

At 808, the method 800 includes determining a context of the one or more words, phrases, or sentences. The context of the one or more words, phrases, or sentences may be determined using an ML model. The ML model can be used to determine the context of the one or more words, phrases, or sentences by analyzing data including data associated with a neighboring word range of a word, a user speech profile, location data to determine a geographic region of the user, or a combination thereof.

At 810, the method 800 includes determining whether the text data is missing one or more words based on the context of the one or more words, phrases, or sentences. At 812, the method 800 includes generating a predicted word when it is determined that the text data is missing one or more words. Generating a predicted word includes determining which words of the text data are missing. The prediction of the one or more missing words can be generated using an ML model based on the context of the one or more words, phrases, or sentences, a user speech profile, or both.

At 814, the method 800 includes synthesizing one or more predicted words to replace one or more missing words in the audio stream. The one or more predicted words may be synthesized in a voice of the real-time communication session participant associated with the user device. If there are multiple real-time communication session participants sharing one user device for the real-time communication session, synthesizing the one or more predicted words may include the use of voice recognition software to identify the particular real-time communication session participant that is speaking, and synthesizing the one or more predicted words in the identified real-time communication session participant's voice.

At 816, the method 800 includes combining the one or more synthesized words with the audio stream to generate a combined audio stream. In an example, each synthesized word is inserted into a respective portion of the audio stream that corresponds to a respective missing word to generate the combined audio stream. The combined audio stream is a continuous audio stream that does not have missing words. At 818, the method 800 includes transmitting the combined audio stream to the user devices of the other real-time communication session participants.

In some implementations, the method 800 may include transmitting a notification to the user devices of the other real-time communication session participants that indicates that a portion of the combined audio stream is synthesized. The notification can be transmitted as an embedded notification within the combined audio stream or as a separate notification. The notification can be a visual notification or an audible notification.

In some implementations, the method 800 may include transmitting a request to the user device of the real-time communication session participant that is speaking. The request may be a request for feedback regarding the accuracy of the synthesized portion of the combined audio stream. The method 800 may include receiving a message in response to the request that indicates whether the synthesized portion of the combined audio stream is accurate. The method 800 may include updating an ML model for determining a missing word based on the message.

In some implementations, the method 800 may include converting speech data of the combined audio stream to text data. The text data of the combined audio stream may be transmitted to the one or more other user devices connected to the real-time communication session, the user device of the real-time communication session participant that is speaking, or both.

An aspect of this disclosure includes a method that includes obtaining a first audio stream from a user device connected to a real-time communication session. The method includes detecting missing packets in the first audio stream. The method includes obtaining, from the user device, recorded portions of audio corresponding to the missing packets. The method includes combining the recorded portions of the audio with the first audio stream to generate a second audio stream without missing packets. The method includes transmitting the second audio stream to one or more other user devices connected to the real-time communication session.

An aspect of this disclosure includes a system that includes a first user device, a second user device, and a third user device. The first user device is connected to a real-time communication session. The second user device is connected to the real-time communication session. The server is configured to obtain a first audio stream from the first user device. The server is configured to detect missing packets in the first audio stream. The server is configured to obtain, from the first user device, recorded portions of audio corresponding to the missing packets. The server is configured to combine the recorded portions of the audio with the first audio stream to generate a second audio stream without missing packets. The server is configured to transmit the second audio stream to the second user device.

An aspect of this disclosure includes a non-transitory computer-readable medium comprising instructions stored in a memory, that when executed by a processor, cause the processor to perform operations. The operations include obtaining a first audio stream from a user device connected to a real-time communication session. The operations include detecting missing packets in the first audio stream. The operations include obtaining, from the user device, recorded portions of audio corresponding to the missing packets. The operations include combining the recorded portions of the audio with the first audio stream to generate a second audio stream without missing packets. The operations include transmitting the second audio stream to one or more other user devices connected to the real-time communication session.

One or more aspects may include transmitting a negative acknowledgement to the user device for each missing packet of the missing packets. The negative acknowledgement may be transmitted based on detecting the missing packets. One or more aspects may include detecting speech data in the first audio stream and the recorded portions of the audio. One or more aspects may include converting the speech data to text data. One or more aspects may include transmitting the text data to one or more real-time communication session participant devices. In one or more aspects, the text data may be embedded in the second audio stream. In one or more aspects, the first audio stream may be stored in a buffer for a threshold duration to combine the recorded portions of the audio with the first audio stream. In one or more aspects, each recorded portion of the recorded portions may correspond to a respective missing packet of the missing packets. In one or more aspects, the combining of the recorded portions of the audio with the first audio stream may include correlating a timestamp of each recorded portion to a sequence number of the respective missing packet and inserting each recorded portion into a respective timeslot of the respective missing packet. In one or more aspects, an acknowledgement may be transmitted to the first user device for each received packet. In one or more aspects, text data and the second audio stream may be simultaneously transmitted to the second user device. In one or more aspects, the text data may be embedded in the second audio stream. In one or more aspects, the first audio stream may be stored in a buffer for a threshold duration. In one or more aspects, a timestamp of each recorded portion of the recorded portions may correspond to a sequence number of a respective missing packet of the missing packets. In one or more aspects, each recorded portion may be inserted into a respective timeslot of the respective missing packet based on the sequence number of the respective missing packet.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
obtaining a first audio stream from a user device connected to a real-time communication session via a unified communications as a service (UCaaS) platform;
determining a context of a phrase in the first audio stream;
determining that a syntax of the phrase in the first audio stream is indeterminable;
generating, using a deep neural network (DNN) trained on speech cadence data associated with a speed at which a user speaks to convert text data to a wave form, synthesized words based on the determination that the syntax of the phrase in the first audio stream is indeterminable, wherein the synthesized words are generated based on the context of the phrase in the first audio stream using a speech profile that includes a geographic region;
combining the synthesized words with the first audio stream to generate a second audio stream; and
transmitting the second audio stream to one or more other user devices connected to the real-time communication session.

2. The method of claim 1, wherein the synthesized words are generated using a machine learning model.

3. The method of claim 1, further comprising:
detecting speech data in the first audio stream;
converting the speech data to text data; and
transmitting the text data to one or more real-time communication session participant devices.

4. The method of claim 1, further comprising:
detecting speech data in the first audio stream;
converting the speech data to text data; and
transmitting the text data to one or more real-time communication session participant devices, wherein the text data is embedded in the second audio stream.

5. The method of claim 1, wherein the first audio stream is stored in a buffer for a threshold duration to combine the synthesized words with the first audio stream.

6. The method of claim 1, wherein the synthesized words correspond to missing packets.

7. The method of claim 1, wherein the synthesized words correspond to respective missing packets, and wherein combining the synthesized words with the first audio stream comprises:
correlating a timestamp of the synthesized words to a sequence number of the respective missing packets.

8. A system comprising:
a first user device connected to a real-time communication session via a unified communications as a service (UCaaS) platform;
a second user device connected to the real-time communication session via the UCaaS platform; and
a server configured to:
obtain a first audio stream from the first user device;
determine a context of a phrase in the first audio stream;
determine that a syntax of the phrase in the first audio stream is indeterminable;
generate, via a deep neural network (DNN) trained on speech cadence data associated with a speed at which a user speaks to convert text data to a wave form, synthesized words based on the determination that the syntax of the phrase in the first audio stream is indeterminable, wherein the synthesized words are generated based on the context of the phrase in the first audio stream using a speech profile that includes a geographic region;
combine the synthesized words with the first audio stream to generate a second audio stream; and
transmit the second audio stream to the second user device.

9. The system of claim 8, wherein the server is further configured to:

transmit an acknowledgement to the first user device responsive to the first audio stream.

10. The system of claim 8, wherein the server is further configured to:
    detect speech data in the first audio stream;
    convert the speech data to text data; and
    simultaneously transmit the text data and the second audio stream to the second user device.

11. The system of claim 8, wherein the server is further configured to:
    detect speech data in the first audio stream;
    convert the speech data to text data; and
    embed the text data in the second audio stream.

12. The system of claim 8, wherein the server is further configured to:
    store the first audio stream in a buffer for a threshold duration.

13. The system of claim 8, wherein the synthesized words correspond to one or more missing packets.

14. The system of claim 8, wherein the server is further configured to:
    generate a list of predicted words based on the syntax of the phrase in the first audio stream.

15. A non-transitory computer-readable medium comprising instructions stored in a memory, that when executed by a processor, cause the processor to perform operations comprising:
    obtaining a first audio stream from a user device connected to a real-time communication session via a unified communications as a service (UCaaS) platform;
    determining a context of a phrase in the first audio stream;
    determining that a syntax of the phrase in the first audio stream is indeterminable;
    generating, using a deep neural network (DNN) trained on speech cadence data associated with a speed at which a user speaks to convert text data to a wave form, synthesized words based on the determination that the syntax of the phrase in the first audio stream is indeterminable, wherein the synthesized words are generated based on the context of the phrase in the first audio stream using a speech profile that includes a geographic region;
    combining the synthesized words with the first audio stream to generate a second audio stream; and
    transmitting the second audio stream to one or more other user devices connected to the real-time communication session.

16. The non-transitory computer-readable medium of claim 15, wherein the synthesized words are generated using a machine learning model.

17. The non-transitory computer-readable medium of claim 15, the operations further comprising:
    detecting speech data in the first audio stream;
    converting the speech data to text data; and
    transmitting the text data to one or more real-time communication session participants.

18. The non-transitory computer-readable medium of claim 15, wherein the first audio stream is stored in a buffer to combine the synthesized words with the first audio stream.

19. The non-transitory computer-readable medium of claim 15, wherein the synthesized words correspond to respective missing packets.

20. The non-transitory computer-readable medium of claim 15, wherein combining the synthesized words with the first audio stream comprises:
    inserting the synthesized words into respective timeslots corresponding to respective missing packets.

* * * * *

UNITED STATES PATENT AND TRADEMARK OFFICE
CERTIFICATE OF CORRECTION

| | | |
|---|---|---|
| PATENT NO. | : 12,388,888 B2 | Page 1 of 1 |
| APPLICATION NO. | : 18/069372 | |
| DATED | : August 12, 2025 | |
| INVENTOR(S) | : Nick Swerdlow | |

It is certified that error appears in the above-identified patent and that said Letters Patent is hereby corrected as shown below:

On the Title Page

Item (71) Applicant:
Zoom Video Communications, Inc., San Jose, CA (US)
Should be:
Zoom Communications, Inc., San Jose, CA (US)

Signed and Sealed this
Fourteenth Day of October, 2025

John A. Squires
*Director of the United States Patent and Trademark Office*